Oct. 13, 1959     E. M. KIPP     2,908,537
PISTON RING

Filed Feb. 11, 1958

INVENTOR.
EGBERT M. KIPP

BY

*Edward B. Foote*
ATTORNEY

United States Patent Office 2,908,537
Patented Oct. 13, 1959

2,908,537

PISTON RING

Egbert M. Kipp, Devon, Pa., assignor to Aluminum Company of America, Pittsburgh, Pa., a corporation of Pennsylvania Application February 11, 1958, Serial No. 714,554

5 Claims. (Cl. 309—44)

This invention relates to piston rings for internal combustion engines, and relates particularly to such rings incorporating means for lubricating the bearing faces of the ring and the cylinder wall of the engine contacted by the piston ring.

It is the object of this invention to provide a piston ring which carries a long-lasting, highly effective lubricant that does not produce objectionable carbon deposits on the engine cylinder wall, piston or piston rings.

In accordance with the invention, piston rings for internal combustion engine pistons are provided with an annular groove or recess extending inwardly from the bearing face of the ring, and have an insert seated in that groove which is composed of polytetrafluoroethylene and a supporting material therefor. The outer face of that insert extends to the bearing face of the ring. During operation of pistons equipped with such rings polytetrafluoroethylene from the insert rubs onto the cylinder walls of the engine, and thence onto the bearing face of the piston rings, forming a thin lubricating film thereon.

Polytetrafluoroethylene is a hard, waxy material having a high melting point. It is sufficiently stable physically and chemically under the temperature conditions encountered, and against the hot combustion gases and the lubricants which come in contact with it in internal combustion engines, for the lubricating film thereof to be extremely durable and for the inserts in the piston rings to afford a long-lasting source of lubricant. The preparation of polytetrafluoroethylene is disclosed in U.S. Patent 2,230,654.

Figure 1:
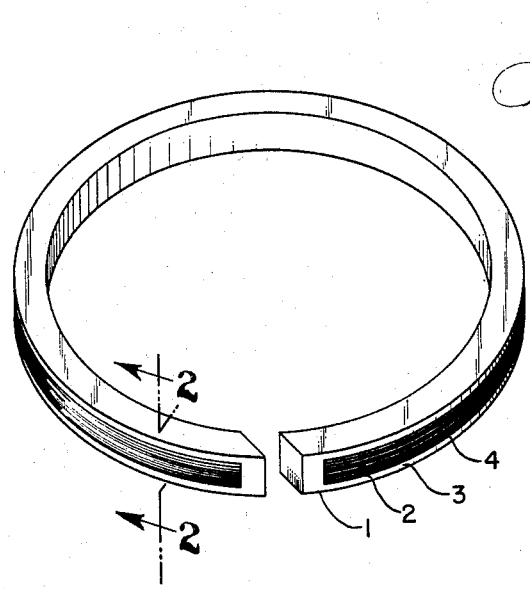
Figure 2:
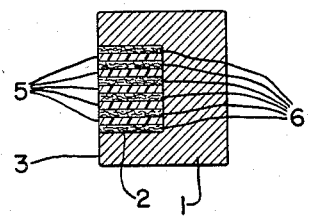

The invention will be further described with reference to the embodiment thereof illustrated in the accompanying drawings, in which Fig. 1 is a perspective view of a piston ring having an insert therein in accordance with our invention, and Fig. 2 is an enlarged sectional view, taken on the line 2—2 of Fig. 1.

Referring to the drawings, the split metal piston ring 1 is provided with an annular groove 2 opening into the bearing face 3 of the ring. Seated in the groove is a laminated insert 4 composed of strips 5 (Fig. 2) of polytetrafluoroethylene, separated by layers 6 of a filler. Strips of glass fiber cloth or asbestos fiber cloth are examples of fillers having adequate strength and best resistance to withstand the conditions to which the insert is subjected in use. In the preferred form of the invention, the groove 2 and the insert 4 therein terminate short of the ends of the ring, as is shown in Fig. 1, so that the metal of the ring protects the ends of the insert from attack or erosion by hot gases passing through the split in the piston ring.

The insert 4 may be held in place in the piston ring by means of a suitable cement, such as a sodium alcoholate cement or an epoxy resin adhesive (for example, "No. 201 Adhesive," sold by The Garlock Packing Company). Strips of polytetrafluoroethylene are difficult to bond to metal surfaces. For that reason the top layer and the bottom layer of the insert consist of strips of filler material, which can be bonded readily to the walls of the groove 2. Alternatively, the insert may be held in place in the groove 2 by means of mechanical fasteners.

The outer face of the insert 4 is flush with the bearing face 3 of the ring, but the elevated temperatures to which the piston rings are subjected in internal combustion engines cause the polytetrafluoroethylene to expand enough to project into contact with the cylinder walls during use of piston equipment with the piston rings. As a result, a thin film of polytetrafluoroethylene is transferred to the cylinder walls and acts as a lubricant between the cylinder walls and the piston and piston rings. Despite the fact that polytetrafluoroethylene is known to have low strength, and to be subject to thermal decomposition, at the elevated temperatures commonly encountered in the cylinders and pistons of internal combustion engines, such as temperatures of 600–650° F., the lubricating effect of the polytetrafluoroethylene lasts extremely long.

The number of layers of polytetrafluoroethylene and filler material desirable for best results depends on various factors, such as the thickness of the layers, the thickness of the insert, the size and number of piston rings used in a piston, and the strength needed in the insert. In general, it is desirable to have as much polytetrafluoroethylene present as is consistent with adequate strength in the insert.

In another form of the invention, the insert in the piston ring may consist of one or more layers of a porous supporting material—such as the glass fiber cloth or asbestos fiber cloth mentioned above—impregnated with polytetrafluoroethylene. Such impregnation can be effected by immersing the supporting material in an aqueous dispersion of polytetrafluoroethylene, thereafter driving off the solvent from the insert, and subsequently heating the material at elevated temperature, such as about 750° F. In still another form of the invention, the insert may be composed of a mixture of finely divided polytetrafluoroethylene and particles of filler material, compressed into a unitary structure. In both of the embodiments just mentioned the polytetrafluoroethylene transferred from the insert to the bearing face of the piston ring and the cylinder walls of the engine, acts as a lubricant.

As an illustration of the effectiveness of the invention, the head of a piston of a commercial radial gas engine whose cylinder walls are normally lubricated by oil fed continuously thereto was equipped with four piston rings of the type described above, having laminated inserts cemented therein composed of seventeen strips of polytetrafluoroethylene interleaved with eighteen strips of glass fiber cloth, the strips having been compressed together into a unitary body. During operation of the engine, normal oil flow was maintained to the aforesaid cylinder for the first 1,000 hours of operation; for the next 500 hours, one-half of the normal amount of oil was fed to the cylinder, and thereafter no oil was fed to it. After 2,300 hours of operation without oil flow to the cylinder, the piston rings, piston skirt and cylinder wall showed no more than normal wear, and were perfectly clean.

I claim:

1. A piston ring having an annular groove in its outer face, and a laminated insert seated in the said groove, the said laminated insert being composed of alternating layers of polytetrafluoroethylene and a filler.

2. A piston ring having an annular groove in its outer face, and an insert seated in said groove, the said insert being composed of polytetrafluoroethylene and a glass fiber cloth filler.

3. A piston ring having an annular groove in its outer face, and an insert seated in said groove, the said insert being composed of polytetrafluoroethylene and an asbestos fiber cloth filler.

4. A piston ring having an annular groove in its outer face, and a laminated insert seated in the said groove, the said laminated insert being composed of alternating layers of polytetrafluoroethylene and a glass fiber cloth filler.

5. A piston ring having an annular groove in its outer face, and a laminated insert seated in the said groove, the said laminated insert being composed of alternating layers of polytetrafluoroethylene and an asbestos fiber cloth filler.

References Cited in the file of this patent

UNITED STATES PATENTS

| | | |
|---|---|---|
| 1,251,906 | Moratta | Jan. 1, 1918 |
| 2,539,329 | Sanders | Jan. 23, 1951 |
| 2,575,394 | Rice | Nov. 20, 1951 |
| 2,807,511 | Fleming | Sept. 24, 1957 |
| 2,846,280 | Berg | Aug. 5, 1958 |

OTHER REFERENCES

Product Engineering (Thermosetting Plastic Laminates, I), December 1948, pp. 123–126.